United States Patent [19]

Gart et al.

[11] Patent Number: 4,788,597
[45] Date of Patent: Nov. 29, 1988

[54] REMOVABLE CONFORMING VIDEO DISPLAY TERMINAL FILTER

[75] Inventors: Mark Gart, Novato; Robert P. Glaser, Fairfax, both of Calif.

[73] Assignee: Sun-Flex Company Incorporated, Novato, Calif.

[21] Appl. No.: 159,242

[22] Filed: Feb. 23, 1988

[51] Int. Cl.$^4$ .............................................. H04N 5/72
[52] U.S. Cl. .................................. 358/253; 358/252; 358/247
[58] Field of Search ............... 358/252, 253, 245, 247; 361/220; 174/35 MS

[56] References Cited

U.S. PATENT DOCUMENTS

| | | | |
|---|---|---|---|
| 3,582,189 | 6/1971 | Moritz et al. | 350/276 |
| 4,246,613 | 1/1981 | Choder et al. | 358/245 |
| 4,354,205 | 10/1982 | Lowe et al. | 358/250 |
| 4,427,264 | 1/1984 | Kamerling | 350/276 |
| 4,504,867 | 3/1985 | Keller | 358/247 |
| 4,529,268 | 7/1985 | Brown | 350/276 |
| 4,577,928 | 3/1986 | Brown | 350/276 |
| 4,591,920 | 5/1986 | Yano | 358/250 |
| 4,628,365 | 12/1986 | Carlton | 358/253 |
| 4,633,322 | 12/1986 | Fourney | 358/252 |
| 4,652,085 | 8/1987 | Selling et al. | 350/318 |
| 4,686,576 | 8/1987 | Dickie et al. | 358/253 |
| 4,745,518 | 5/1988 | Fang | 358/252 |

FOREIGN PATENT DOCUMENTS 2067380  7/1981  United Kingdom ............... 358/252

Primary Examiner—Edward L. Coles, Sr.
Attorney, Agent, or Firm—George W. Wasson

[57] ABSTRACT

A removable conforming video display terminal filter is disclosed. The combination of a filter element and a filter bezel is adapted to be added to a video display terminal that does not have an installed filter. The filter and bezel are adapted to be mounted to the terminal without opening the enclosure of the terminal. The filter conforms to the face of the cathode ray tube and the bezel presses the filter against the face. The filter bezel may be adapted with hanger means that permit the filter and bezel to be removably attached to the terminal. The filter is capable of reducing or eliminating both glare and radiation from the terminal and the filter is adapted to be grounded to a suitable ground circuit.

9 Claims, 2 Drawing Sheets

U.S. Patent    Nov. 29, 1988    Sheet 1 of 2    4,788,597
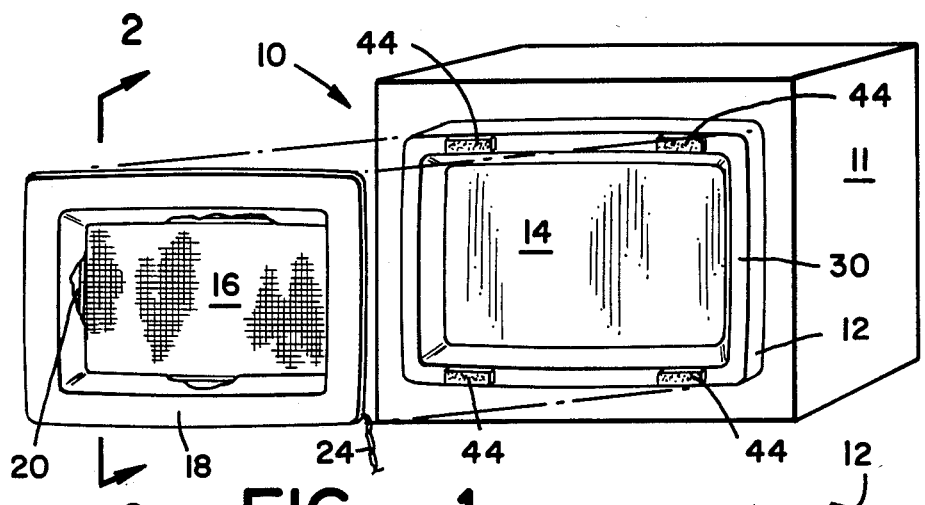
FIG _ 1
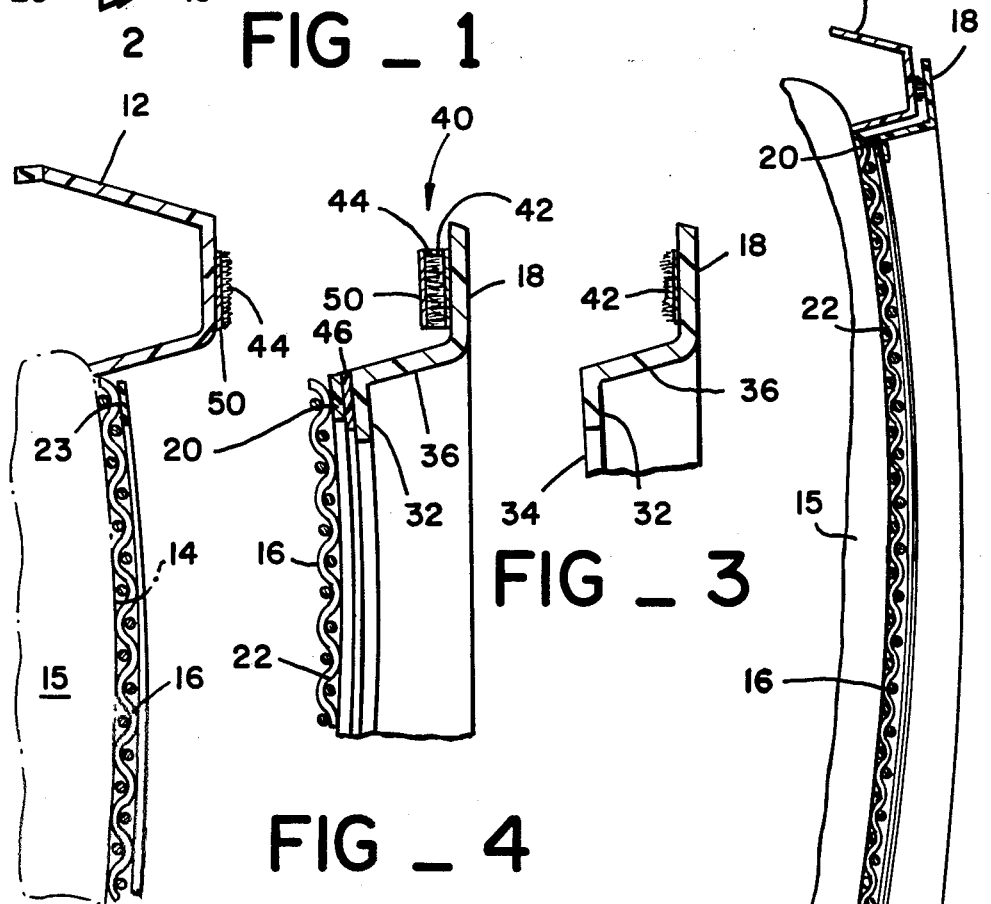
FIG _ 3
FIG _ 4
FIG _ 5
FIG _ 2

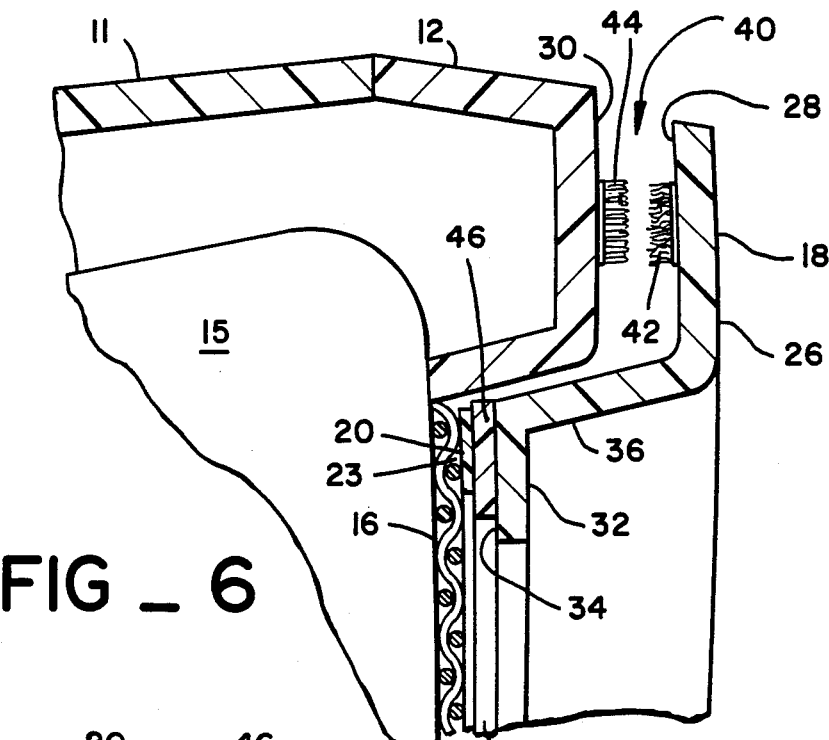
FIG_6
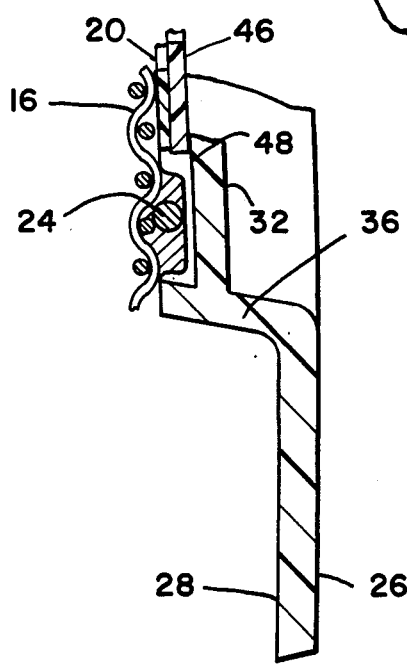
FIG_7
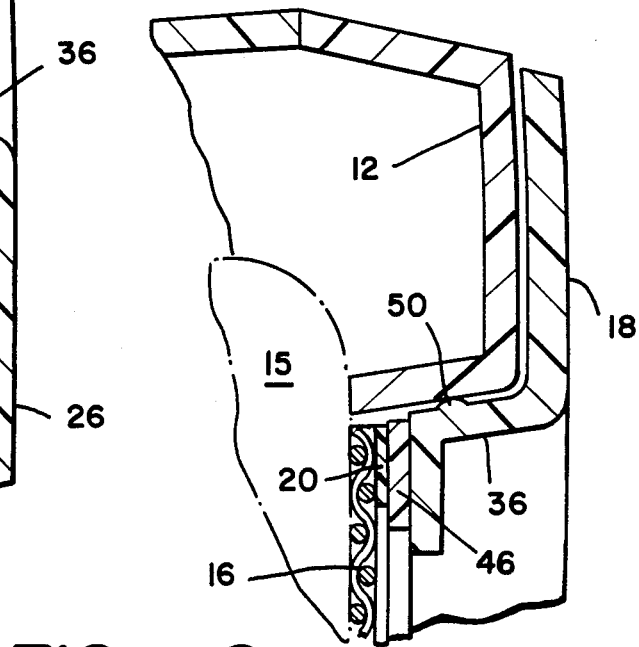
FIG_8

REMOVABLE CONFORMING VIDEO DISPLAY TERMINAL FILTER

FIELD OF THE INVENTION

This invention relates to a device for use with an enclosed video display terminal for the purpose of reduction of surface glare from the face of the tube and for suppressing the radiation and static electricity emitted by the electronic components of the video display terminal including the cathode ray tube. More particularly the invention relates to a filter and bezel that can be adapted to be effectively installed on a video display terminal enclosed in a housing without opening the housing.

BACKGROUND OF THE INVENTION

The introduction of the video display terminal has brought on a substantial change in the office, school and home environment. These new, labor saving devices usually consist of a TV-like cathode ray tube attached to a keyboard and linked to a computer.

Not very many years ago, video display terminals were used on a regular basis only by computer professionals and in limited speciality fields such as air transportation and typesetting. In the recent years the use of such display devices has experienced a rapid growth to the extent that in 1985 it was estimated that there were about thirteen million video display terminals in use in the United States and Canada alone. The phenomenal growth in the use of such devices has brought a parallel growth in the number of people using such devices. It is estimated that 40-50% of American workers will be making daily use of video display terminals by 1990 at more than thirty-eight million video display terminal stations in factories, schools, offices and homes.

A growing number of children are now using video display terminals in the class room as computers become an integral part of every school program. In addition, the children have extensive use of video display terminals for recreational purposes, such as video games and home computers.

The increased use of video display terminals has several side effects that need consideration. Included in those effects are X-ray radiation given off as a secondary emission from the impact of high speed electrons on the viewing screen, ultraviolet radiation and visible light given off from the excitation of the phosphors on the inner surface of the screen, infrared radiation produced from the heat generated on the viewing screen by the impact of electrons and the excitation of the phosphors, pulsating very low frequency fields (VLF) at 15-20 Khz generated by the electrical pulses which cause the beam to go "on" and "off" eleven million times a second, radio frequencies generated by pulsations coming from the coordinating circuits, extremely low frequencies (ELF) of 30-60 Hz produced from the electrical pulses which cause the beam to move vertically in order to refresh the full frame 30 to 60 times a second, and static electricity produced as a result of electrons being ejected from the electron beam.

During recent years, evidence of video display terminal related illnesses has surfaced and an increasing number of health complaints have been reported to the National Institute of Occupational Savety and Health (NIOSH) in the United States. The complaint rate has reached a level where video display terminal operators are number one on OSHA's complaint list. These health complaints have initiated an increase in research into the possible health effects of specifically radiation emissions from the video display terminal. The present stage of this research indicates that the health impact most likely is generated by the high levels of nonionizing radiation emitted from video display terminals. A number of scientific studies have shown that such radiation is biologically very active and has serious adverse impact on animal embroys, as well as creating a significantly higher cancer rate in animals and humans.

It is also observed that the low level radiation and the extremely low level radiation emitted from video display terminals has a very high electric component and a much lower magnetic component.

Today, several scientists recommend shielding the video display terminals for such radiation. Among others, this includes Dr. H. D. Sharma, University of Waterloo, Toronto, Canada and Dr. Art Guy, Professor at University of Washington, Seattle, Washington, in a report to International Business Machine Corporation.

It has been shown that placing a suitable filter on the face of the cathode ray tube of a video display terminal can be effective in reducing or eliminating the radiation and glare problems above described.

While many of the present manufacturers of video display terminals provide the display terminal with a filter screen that can be effective in reducing glare and radiation, there are still a great number of display terminals in use that were never equipped with such filters. Further there are still display terminals being sold that are not equipped with filters. There is therefore a need to provide a system for installing effective filters on unfiltered systems.

Retrofitting a filter to an existing video display terminal is complicated by the existance of secure enclosures enclosing the display terminal and its associated electronic components. Further, some manufacturers have restrictive warranty policies that effectively prohibit a user or owner of the terminal from opening the enclosure to attach a filter to the terminal from within the enclosure. It is therefore desireable to provide a filter and a method for its installation that can be accomplished from the outside of the enclosure for the terminal. The filter must be able to be installed in a manner that will not interfere with the display area of the terminal and will not degradate the display quality while being effective to reduce or eliminate glare and radiation from the terminal.

Prior art filter devices are illustrated in U.S. Pat. Nos. 4,253,737 E. K. Thomsen et al; 4,468,702 L. H. M. Jandrell; and 4,661,856, P. G. Schnack. These patents describe the need for and the formation of filter screens that can be installed behind the bezel of a video display terminal as the device containing the terminal is being manufactured. Those patents do not address the problem of adapting and installing a filter to an existing terminal from the exterior of the housing of the terminal.

SUMMARY OF THE PRESENT INVENTION

The present invention is directed specifically to the problem above described and accomplishes the installation of a filter screen on the face of a video display terminal in a manner to accomplish complete conformance of the filter to the contour of the terminal while providing a reduction in the glare and radiation from the terminal.

An object of the present invention is a preformed glare and radiation suppression device that is adapted to be mounted on the face of a video display terminal in a manner to provide dependable attachment of the device to the video display terminal without opening the enclosure of the terminal.

A further object of the present invention in accord with the preceeding object is to provide an economical method for providing glare and radiation suppression on video display terminals not previously provided with suppression devices.

Another object of the present invention is a novel formation of a suppression device of the type above described that will permit the attaching of the device to a video display terminal from the exterior of the housing enclosing the terminal.

Further objects and features of the invention will be readily apparent to those skilled in the art from the appended drawings and specification illustrating a preferred embodiment wherein:

BRIEF DESCRIPTION OF THE DRAWINGS

FIG. 1 is a perspective view of a typical apparatus employing a video display terminal and illustrating the relationship of the present invention to the typical apparatus.

FIG. 2 is a sectional view of the present invention mounted on a video display terminal and illustrating the assembled filter and filter bezel attached to the terminal bezel.

FIG. 3 is a partial sectional view through a portion of the filter bezel.

FIG. 4 is a partial sectional view through the filter, filter bezel and hanger means prior to being mounted on a video display terminal.

FIG. 5 is a partial sectional view of the terminal bezel and enclosure with one part of the hanger on the terminal bezel and with the filter placed on the face of a cathode ray tube.

FIG. 6 is an enlarged sectional view showing the alignment of elements just prior to mounting on a video display terminal.

FIG. 7 is a partial sectional view showing an indentation in the filter bezel flange.

FIG. 8 is an alternative mounting for the filter bezel to a terminal bezel.

DETAILED DESCRIPTION OF THE INVENTION

The present invention is useful in a device such as a video display terminal, television or other device using a cathode ray tube. As illustrated in FIG. 1, a video display terminal is shown at 10 having a case 11 and a terminal bezel 12. The front of the case and bezel of the video display terminal are frequently an integral unit. The display face 14 of the video display terminal is that portion of the face of a cathode ray tube 15 that is within the opening of the bezel 12. The assembled device of the present invention is a mesh filter 16 adapted to be mounted to the face of the cathode ray tube 14 behind a mounted filter bezel 18.

The present invention is directed to overcoming one or more of the problems experienced with mounting glare shielding mesh filters, as described in Canadian Pat. No. 521,316, in U.S. Pat. No. 4,253,737 and U.S. Pat. No. 4,468,702. As described in the foregoing paragraphs, there are a large number of unsheilded video display terminals in use and many more such devices will be produced in the years to come before regulations are established to reduce the exposure to such hazards. The case of mounting a glare and radiation shielding device has been a central issue because the large number of video display terminals are very hard and dangerous to disassemble and, further, many manufacturers of video display terminals have placed restrictions on their warranties if the terminals are disassembled by others than the manufacturer's representatives. Those limitations can be overcome by the mounting of such a shielding device in front of the bezel of the video display terminal without disassembling the video display terminal or the case of the unit. The prior art has suggested that such mounting can be carried out by a front plate filter in a flat, stiff frame as described in the above Canadian Patent. A preferred solution is by a filter as described in the present invention.

Disadvantages of the flat, front plate filter, as described in the Canadian Patent are that moire patterns are created between the surface of the cathode ray tube and the back side of the mesh, and the mesh is extremely vulnerable to damage because of lack of support from the back. Also, the flat plate filter presents considerably increased surface shine because of the flat configuration.

The assembly of the present invention is designed to conform the mesh or fabric of the screen to the face of the cathode ray tube and to hold the filter in place by attaching a filter bezel to the video display terminal. It is also a feature of the present invention to provide a frame having the lowest possible width in cross-section to cover up a minimum area of the viewing face of the cathode ray tube while providing a frame that will create sufficient stiffness to maintain tension on the fabric. The filter is then held in place on the face of the terminal by a filter bezel that fits over the terminal bezel and is held firmly in place by suitable means attaching the filter bezel to the terminal bezel or to the case of the video display terminal.

The shield device described in U.S. Pat. No. 4,468,702 can be adhered directly to the glass of a cathode ray tube but the flat format of the flexible frame makes it difficult to get full conformance to the tube face and experience has shown that the flat frame will remove it away from the tube face and that the filter falls easily off if not installed behind the terminal bezel of the apparatus. The present invention overcomes this significant problem.

In accord with the present invention the filter 16 is a micro mesh screen usually made of a woven fabric suitably darkened to avoid interference with the images formed on the display face 14 of a cathode ray tube 15. The filter is formed with a frame 20 surrounding its perimeter and the frame is moulded with curvature in both of if its planar dimensions to conform to the face 14 of the cathode ray tube 15 in the video display terminal 10. While cathode ray tubes are in several different sizes, the face of those different sizes are usually formed in a limited number of curvatures so that the selection of a filter 16 for a specific video display terminal can be made from a variety of available filter frames formed both in perimeter and in face curvature. The frame 20 is preformed to have the curvature of the face of a cathode ray tube and is produced in any of selected curvature to conform to the conventional and commercially available display tubes.

As illustrated in the cut-away portions of the filter bezel 18 of FIG. 1, the filter frame 20 has a rectangular perimeter configuration in the plane of its formation as if the plane of the frame was a portion of the surface of a sphere. The rectangular perimeter formation of the frame 20 establishes a top, bottom and side portions for the frame. The curved plane of formation of the frame is such that the top and bottom portions have a curvature of the same radius and the side portions have another, and possibly different, radius of curvature. FIG. 2 illustrates a section along the lines 2—2 of FIG. 1 through the assembly of the filter 16 and terminal bezel 18 when mounted on a video display terminal and illustrates the radius of curvature of the frame in that axis of the frame.

The filter 16 as illustrated has a fabric 22 secured to the inner surface of the frame 20 in a manner to create the desired smooth inner surface on the frame. As illustrated in FIG. 2 the frame 20 has the fabric 22 secured to its inner surface and a solvent bonder is applied on the surface of the fabric and frame to establish a complete bonding of the fabric to the frame. If the filter is intended to function both as a glare filter and radiation filter it is desireable to include an electrical conductor within the bonded attachment of the fabric and frame at some point around the perimeter of the frame. The conductor has a purpose to be describe hereinafter.

The inner surface of the frame 20 may be painted with a conductive paint on the surface where the fabric 22 is to be installed to produce a conductive frame and filter. In one preferred method of assembly, the frame with the painted conductive surface is placed on a stretching table with the fabric stretched on the top of the frame. The fabric is then bonded to the frame with a solvent bonder, dissolving the conductive paint and the fabric and frame, creating a permanent bond with all of the materials and the conductive paint. The fabric or mesh 22 is bonded to the frame 20 and painted surface by the solvent bonder. A conductive wire is shown at 24 in its position of being bonded to the fabric and frame in the assembly.

The fabric 22 is created by either weaving conductive yarn or wires in a square pattern, or by coating or impregnating a standard micromesh with a conductive material. The fibers in the fabric should have a diameter in the 30 to 80 micron range, depending upon whether the application is for color or black and white monitors. The color monitors have a finer dot pattern on the face of the cathode ray tube and therefore require a mesh designed for color displays and a more critical orientation of the fabric on the frame to comply with the dot pattern of the tube.

When the conductive mesh is installed in the frame, as described above, the grounding wire 24 is attached to the conductive side of the frame, creating a means for permanent grounding for the fabric. Grounding of the filter assembly with the wire 24 attached to the case or chassis of the video display device substantially eliminates the passage of radiation from the tube toward the viewer through the face of the cathode ray tube. The surface resistivity of the mesh or fabric material should be in the range of $10^{-3}$ to $10^4$ ohms per unit square and the surface resistivity of the frame material should be in the range of $10^{-4}$ to $10^2$ ohms per unit square. With such a construction the approximate attenuation should be $-40$ db for the electrical component of the electromagnetic radiation at a frequency of 1 megahertz. Such attenuation will reduce known levels of the electromagnetic field of VLF and ELF radiation far below even the most conservative safety standards.

The filter 16 and its formed frame 20 of the present invention is adapted to be pressed against the display face 14 of the cathode ray tube 15 by a filter bezel 18 that is sized to cooperate with the size of the filter frame 20 and is formed in curvature in its two dimensions of its plane to conform to the curvature of the face of the cathode ray tube 15 of the terminal on which the filter and filter bezel are to be mounted. Typical radius of curvature for the spherical or eliptical form could be a radius of 20 to 25 inches depending on the size of display tube to be covered.

The spherical frame 20 as described fits directly on the face of the cathode ray tube within the opening of the terminal bezel of the video display terminal and mounts in close contact with the tube face and conforms the fabric 24 directly to the tube face. While the frame of the present invention could be mounted to the face of a display tube of a video display terminal by attaching the frame with an adhesive surface, it has been found that such a mounting is less effective than a positive mounting by an additional filter bezel supported on the face of the video display terminal. The form of the frame and its contour provides for a complete contact between the fabric and the tube face and a firm bonding by a filter bezel accomplishes an effective filtering of the radiation and glare as well as providing an asthetically attractive attachment.

The filter bezel 18 of the present invention is, as previously described, moulded in its two planar dimensions to conform as closely as possible to the contour of the face 14 of the cathode ray tube 15 of the video display terminal. As best seen in FIG. 6 the filter bezel 18 has an exterior flange 26 with an inner surface 28 generally parallel to the exterior face 30 of the terminal bezel 12. The filter bezel also has an interior flange 32 with an inner surface 34 generally parallel to the face 14 of the cathode ray tube 15. Between the flanges 26 and 32 is a connecting portion 36 that is generally parallel to a similar surface of the terminal bezel. The interior and exterior flanges are formed to be compatable, respectively, with the contours of the face of the tube and the face of the cabinet of the video display terminal.

In one form of the present invention, the inner surface 28 of the exterior flange 26 has a suitable hanger means 40 attached thereto. The hanger is preferrably a seperable, two part hanger with a portion 42 that is adapted to be firmly attached to the inner surface 28 and a portion 44 that is adapted to be firmly attached to the surface of the exterior flange 30 of the terminal bezel 12. The two part seperable hanger may take the form of a velero fastener, a "dual lock" fastener or any other suitable seperable connectable device. The hanger 40 is shown in the sectional view of FIGS. 2 and 6 and is shown in the elevational view of FIG. 1 where the terminal portion 44 of four such hangers are shown. It should be understood the less or more than four such hangers may be used and that the hangers may be placed at any suitable locations around the terminal and filter bezel as may be needed to accomplish the desired attachment of the filter bezel to the terminal bezel.

The inner surface 34 of the interior flange 32 of the filter bezel 18 has a compressible adhesive liner 46 secured to it along its entire interior periphery. The compressible liner 46 is adapted to be pressed against the outer surface of the filter frame 20 to press the filter against the face 14 of the cathode ray tube 14 and to, at least partially, join the filter to the inner surface 34 of the interior flange 32 of the filter bezel 18.

As illustrated in FIG. 7, at least one corner of the filter bezel 18 is provided with a slight indentation at 48 to allow for the conductive wire 24 to pass from the filter frame 20 to the space between the filter bezel 18 and the terminal bezel to be accessible for connection to a suitable ground at the terminal 10.

It should be evident from the description of the elements of the present invention how the filter is attached as a retrofit to an existing video display terminal without opening the enclosure of the terminal. The hanger assemblies 40 of the filter bezel are preferrably initially supplied with a protective cover on the exposed side of a double sided tape 50 on the portion 44 that is intended to be mounted on the exterior of the terminal bezel. After removal of that cover, the tape 50 is prepared for attachment of the portion 44 to the surface 30 of the terminal bezel 12. With all hangers prepared for attachment, the filter bezel 18 is aligned with the opening of the terminal bezel 12 and pressed into engagement with the flange surface 30 to secure the adhesive surface of the hanger portion 44 to the flange 30. After allowing suitable time for the adhesive to be effective, if time is needed, the filter bezel 18 is removed leaving behind the portion 44 that has now been attached to the flange 30 and retaining with the filter bezel the portion 42 that is attached to the filter bezel. The filter frame 20 with the filter mesh 22 and conductive wire 24 are placed on the face 14 of the cathode ray tube 15 with the wire 24 aligned with the expected position of the indentation 48. The filter bezel 18 is then replaced in the opening of the terminal bezel 12 and pressed against the terminal face to compress the inner surface 34 and the conpressible adhesive liner 46 against the filter frame 20. That pressure can adhere the frame 20 to the interior flange 34 of the filter bezel 18 and, with suitable pressure applied at the locations of the hangers 40, the two part hangers are rejoined to fix the filter bezel to the face of the terminal bezel 12. The wire 24 should have been aligned to be exposed at the outside of the filter bezel so that it may them be attached to an appropriate ground circuit.

With the construction and attachment of the filter screen and bezel of the present invention in the manner just described it should be apparent that the filter may be easily removed should it be necessary to clean its surface or should it need to be replaced. The hangers are adapted to be easily seperated so that the bezel will be removable and the filter will be removed with the bezel. The firm connection of the bezel to the frame of the filter and the contouring of the bezel and filter frame should insure a smooth and complete contact of the filter mesh with the face of the cathode ray tube so as to avoid any distortion in the display on the surface while, at the same time, collecting radiation and suppressing reflections from the display face.

Alternative forms of attaching the filter bezel to the terminal bezel can include a form such as is shown in FIG. 8 where a nipple 50 on the inside of the connecting portion of the filter bezel may be pressed against a matching surface on the terminal bezel 12. Any frictional or press fitting attachment of the filter bezel 18 to the terminal bezel 12 can be used so long as an effective engagement of the flter frame 20 and the mesh 16 to the face of the cathode ray tube is accomplished.

While certain preferred embodiments of the present invention have been specifically disclosed and described, it should be understood that the invention is not limited thereto as many variations will be readily apparent to those skilled in the art and the invention is to be given its broadest possible interpretation within the terms of the following claims.

We claim:

1. A device adapted to be added to the face of a video display terminal for reducing glare and radiation from the face of said terminal, said terminal having a cathode ray tube and an enclosure for said cathode ray tube including a terminal bezel enclosing the face of said cathode ray tube, said device comprising:
    (a) a fine mesh filter having a frame, said frame being formed to conform to the face curvature of said cathode ray tube at least within the enclosure of said terminal bezel.
    (b) a filter bezel having complementary curvature and dimensions to the interior dimensions of said terminal bezel of said video display terminal, said filter bezel having an inner surface for engagement with the outer surface of said interior dimensions of said terminal bezel and an outer surface complementary to said enclosure of said video display terminal,
    (c) hanger means attached to the inner surface of said filter bezel, said hanger means including
        (i) a portion fixed to said inner surface of said filter bezel
        (ii) a removable portion removably secured to said fixed portion,
        (iii) and an adhesive surface on said removable portion at the surface thereof away from said inner surface,
    (d) and means for releasably securing said frame of said filter to the inside surface of said filter bezel,
whereby
    (e) said hanger means may be placed on said video display terminal by pressing said adhesive surface of said hanger means onto the outer surface of said terminal bezel by pressing said filter bezel against said terminal bezel,
    (f) said filter bezel may be removed from said removable portion of said hanger means leaving said removable portion attached to said terminal bezel,
    (g) said frame of said filter may be placed next to the face of said cathode ray tube of said video display terminal by pressing said frame said face of said cathode ray tube,
    (h) and said filter bezel may be attached to said terminal bezel by reconnecting said removable connection of said two portions of said hanger means and pressing said filter bezel against said terminal bezel, said filter bezel being operative to press said filter against said face of said cathode ray tube to establish a conforming contact between said filter and said face.

2. The device of claim 1 wherein said hanger means is any suitable removable connectable device.

3. The device of claim 1 wherein said hanger means is a two part velcro means.

4. The device of claim 1 with the addition of an electrically conductive element connected to said filter and means for connecting said element to a suitable electrical ground for said video display terminal.

5. The device of claim 1 with the addition of a compressible adhesive liner on the perimeter lip of the interior of said filter bezel, said compressible adhesive liner being adapted to cooperate with said frame of said filter to press said filter against the face of said cathode ray tube.

6. The device of claim 4 with the addition of an indentation along said filter bezel to provided a passageway for said electrically conductive element to permit said connection to said electrical ground.

7. The device of claim 1 wherein the interior perimeter configuration of said terminal bezel includes a flange portion at least as large as the perimeter of said frame of said filter, said flange portion of said filter bezel having a compressible adhesive liner attached thereto whereby said filter bezel, when reconnected to said removable connections of said hanger, compresses said adhesive liner on said flange portion against said frame of said filter and presses said filter firmly against the face of said cathode ray tube.

8. The device of claim 1 wherein said hanger means are located on at least the top and bottom of said filter bezel to firmly attach said filter bezel to the top and bottom of said terminal bezel.

9. A device adapted to be added to the face of a video display terminal for reducing glare and radiation from the face of said terminal, said terminal having a cathode ray tube and an enclosure for said cathode ray tube including a terminal bezel enclosing the face of said cathode ray tube, said device comprising:

(a) a fine mesh filter having a frame, said frame being formed to conform to the face curvature of said cathode ray tube at least within the enclosure of said terminal bezel, (b) a filter bezel having complementary curvature and dimensions to the interior dimensions of said terminal bezel of said video display terminal, said filter bezel having an inner surface for engagement with the outer surface of said interior dimensions of said terminal bezel and an outer surface complementary to said enclosure of said video display terminal, (c) and means for releasably securing said frame of said filter to the inside surface of said filter bezel, whereby (d) said frame of said filter may be placed next to the face of said cathode ray tube of said video display terminal by pressing said frame against said face of said cathode ray tube, (e) and said filter bezel may be attached to said terminal bezel by pressing said filter bezel against said terminal bezel, said filter bezel being operative to press said filter against said face of said cathode ray tube to establish a conforming contact between said filter and said face of said cathode ray tube.

* * * * *